J. F. O'SHAUGHNESSY.
APPARATUS FOR USE IN GATHERING COTTON.
APPLICATION FILED AUG. 20, 1913.

1,103,622.

Patented July 14, 1914.

Witnesses:
Chas. C. Rosine
W. A. Darby

Inventor:
James F. O'Shaughnessy
By Samuel E. Darby
his Attorney

UNITED STATES PATENT OFFICE.

JAMES F. O'SHAUGHNESSY, OF NEW YORK, N. Y., ASSIGNOR, BY MESNE ASSIGN-
MENTS, TO COTTON GATHERING CORPORATION, OF NEW YORK, N. Y., A CORPORA-
TION OF DELAWARE.

APPARATUS FOR USE IN GATHERING COTTON.

1,103,622.      Specification of Letters Patent.      Patented July 14, 1914.

Application filed August 20, 1913. Serial No. 785,606.

*To all whom it may concern:*

Be it known that I, JAMES F. O'SHAUGH-NESSY, a citizen of the United States, residing at New York, county of New York, State of New York, have made a certain new and useful Invention in Apparatus for Use in Gathering Cotton, of which the following is a specification.

This invention relates to apparatus for use in gathering cotton.

The object of the invention is to provide means which are simple and efficient for relieving the laborers or operators of much of the physical wear, strains and drudgery incident to the operation of gathering or picking cotton.

A further object of the invention is to provide means, adapted to be moved along and between adjacent rows of cotton stalks, for supporting the laborer or operator and also the bags or other receptacles employed to receive the cotton, manually gathered or picked, from the hands of the laborer or operator, whereby the laborer or operator is relieved of the increasing weight of the receptacle or bag, and also of the necessity for constantly bending or stooping over and then rising or straightening up, and, at the same time, leaving the hands of the operator entirely free to be employed in picking operation.

A further object is to provide means which enable the operator to be transported alongside the rows of cotton stalks at a convenient height with reference to the height of the cotton stalks to enable him to readily effect the cotton gathering or picking operations with either or both hands, thereby increasing his daily capacity.

Other objects of the invention will appear more fully hereinafter.

The invention consists substantially in the construction, combination, location and relative arrangement of parts all as will be more fully hereinafter set forth, as shown in the accompanying drawing and finally pointed out in the appended claims.

Figure 1:
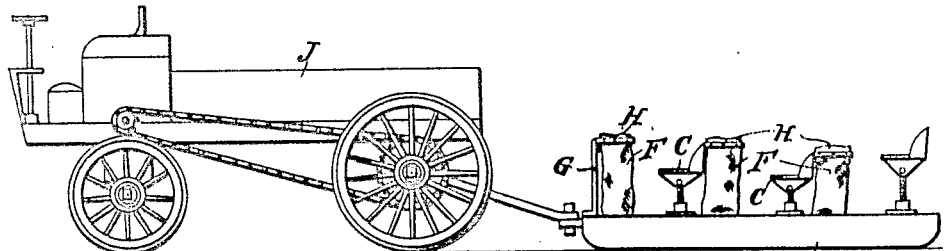
Figure 2:
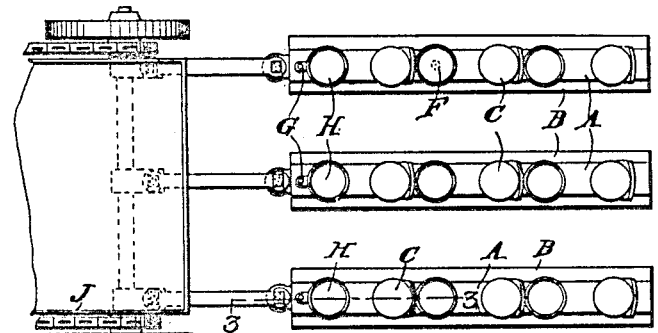
Figure 3:
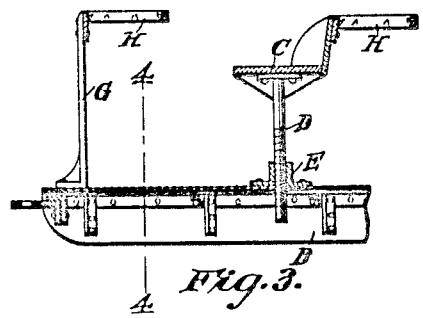
Figure 4:
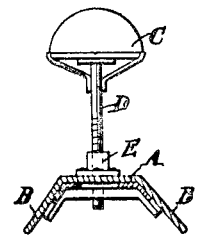

Referring to the accompanying drawing and to the various views and reference signs appearing thereon: Figure 1 is a view in side elevation of an apparatus embodying the principles of my invention. Fig. 2 is a view in top plan view, parts broken off. Fig. 3 is a broken view in vertical longitudinal section on the line 3, 3, Fig. 2. Fig. 4 is a view in vertical transverse section on the line 4, 4, Fig. 3.

The same part is designated by the same reference sign wherever it occurs throughout the several views.

The great difficulty experienced throughout cotton growing countries or sections in procuring laborers for manually harvesting or gathering cotton crops, is due largely to the physical wear and fatigue imposed upon the laborer in the cotton picking or harvesting operation. As this manual operation is usually carried out in practice the laborer is equipped with a bag which is suspended from the shoulder by means of a strap or otherwise and hangs by his side in convenient position to receive the picked cotton from his hands as the same is extracted from the open bolls. The laborer so equipped, proceeds along the row of cotton stalks, picks the cotton by hand from the open bolls and transfers it to the sack. As he proceeds with his work the bag of cotton strapped over his shoulder is constantly increasing in weight as it becomes filled, thereby imposing an ever increasing burden upon the laborer to carry it. Moreover, during the picking operation the laborer, as he proceeds with his work frequently stoops or bends down to gather or pick the cotton, especially that portion which grows close to the ground, and then straightens or rises up again, into an erect or partially erect position to deposit the picked cotton into the bag, or gather the higher cotton. By reason of being thus required to carry the increasing weight of the bag and repeatedly bending over and straightening up, the laborer is subjected to very severe physical wear and strain and fatigue which limits and curtails the daily capacity of his work and which renders the work of harvesting the cotton crop arduous, toilsome, slow, tedious and expensive.

It is among the special purposes of my present invention to provide means for relieving the laborers of the burden and toil of carrying the bag, and also of the necessity of repeatedly stooping or bending and then straightening up, and in carrying out my invention I propose to employ a platform adapted to be moved along and between adjacent cotton rows, and upon which are accommodated supports for the bags for one or more laborers and also seats for the laborers, whereby the laborers may be seated during the cotton picking operation and at a convenient height to enable them to reach and pick or gather the cotton, using both hands freely for that purpose. I also propose to arrange the seats so that they may be independently adjusted in height and may also be freely revolved so as to enable the laborer to accommodate himself to the varying conditions of height of cotton and to shift his position as necessity or desire may dictate.

Referring to the drawing reference sign A, designates a platform of sufficient length to accommodate the desired number of seats. The platform may rest or be supported upon the ground in any suitable or convenient manner. In the particular form shown to which, however my invention is not to be limited or restricted, the platform is supported on runners B. Upon the platform A are mounted one or more seats C, upon which the laborers may be seated while accomplishing their work. In the particular form shown three seats are mounted on the platform, but it is obvious that only one or any desired number of seats may be employed. Each seat is mounted to freely and independently rotate or turn in either direction and to be vertically adjusted according to the exigencies. These results may be accomplished in any suitable or convenient manner. In the particular form shown to which, however, the invention is not to be limited or restricted, each seat is carried by a screw D, which is threaded through a sleeve E, mounted on the platform. By this means each seat is independently adjustable as to height and may also be freely turned in one direction or the other to enable the laborer to pick or gather the cotton from either row of stalks between which rows the platform moves.

The bags to receive the cotton from the hands of the laborers as it is picked or gathered from the open bolls, are designed to be supported upon the platform in any suitable or convenient manner. A convenient arrangement is shown wherein the bag F for the front seat is suspended from a standard G, suitably mounted upon the platform in front of said front seat. The bags for each of the other seats may be conveniently supported on the back of the seat immediately in front of it. If desired, and in order to maintain, the mouths of the bags open so that the picked cotton may be readily and easily deposited therein each bag may be suspended from a hoop or bail H, to which the open end of the bags may be detachably secured. As rapidly as the bags are filled they may be detached and removed and an empty bag placed in position for use without materially arresting or interrupting the picking operation.

The platform with the bag supports, seats and laborers carried thereby may be moved through the cotton field and between adjacent rows of cotton stalks in any suitable or convenient manner. In the form shown the platform is drawn through the field by a traction or motor machine J, but it is obvious and is to be understood that other means for accomplishing this result may be employed. It is also obvious, as shown in the drawing that several platforms may be employed and moved along through the field together. I do not desire, therefore to be limited in this respect.

In the operation of the apparatus the platform, or platforms, where more than one are employed, with the seats thereon adjusted as to height, and with laborers seated thereon, and the bags suitably suspended from their supports, are moved through the cotton field and between adjacent rows of cotton stalks. The laborers pick or gather the cotton and deposit the same in the bags, which when filled, are removed and replaced by empty bags, the laborers being free to use both hands in the picking operation and to turn themselves in any direction. Being relieved of the fatigue, wear and strain incident to the ordinary picking operation the daily capacity of each laborer is greatly increased and the harvesting of the cotton crop is expedited and rendered easy of accomplishment, while the output of each individual laborer is kept separately from that of the others.

Having now set forth the object and nature of my invention, and a construction embodying the principles thereof, what I claim as new and useful and of my own invention, and desire to secure by Letters Patent is:

1. In an apparatus for use in gathering cotton, a platform, a plurality of seats carried thereby, said seats being independently movable, a bag support also mounted on said platform adjacent to each seat, and means for moving said platform along and between adjacent rows of cotton stalks.

2. In an apparatus for use in gathering cotton, a platform having runners resting upon and adapted to be dragged along the ground, a bag support mounted on said platform, a seat also mounted on the platform adjacent the bag support, said seat being mounted for free rotative movement, and means for dragging the platform along the ground.

3. In an apparatus for use in gathering cotton, a platform having runners to rest upon and adapted to be dragged along the ground, means for detachably securing a bag in upright position on said platform, a seat adjustably mounted upon said platform adjacent the bag securing means, said seat being mounted for rotative movement, and means for dragging the platform along the ground.

In testimony whereof I have hereunto set my hand in the presence of the subscribing witnesses, on this 28th day of July A. D., 1913.

JAMES F. O'SHAUGHNESSY.

Witnesses:
G. A. McGrath,
Walter A. Darby.